Dec. 11, 1951  J. H. HARTMAN  2,578,628
VALVE PROTECTOR
Filed May 31, 1949
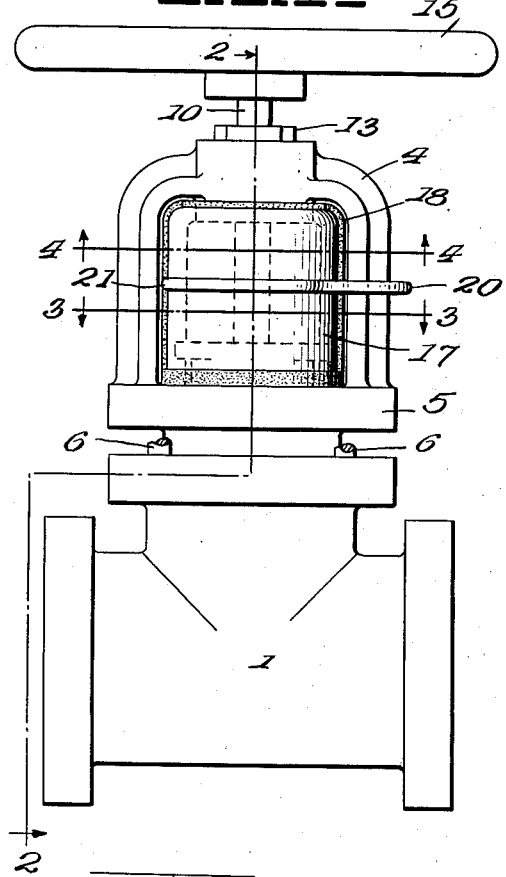
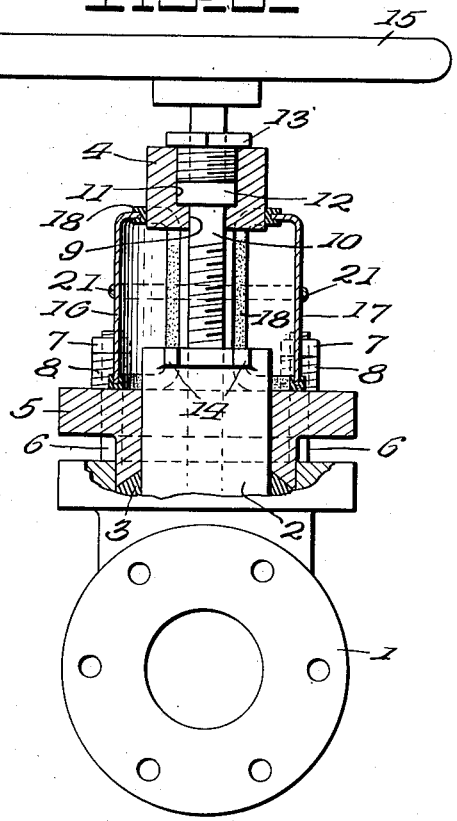
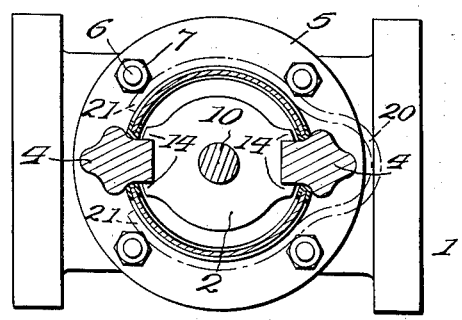
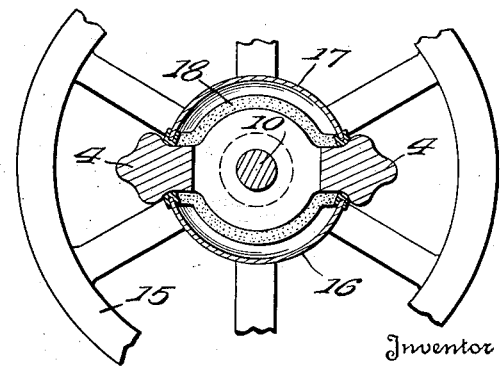
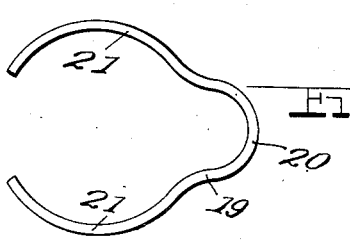
Inventor
Joseph H. Hartman
By Bryant & Lowry
attys.

Patented Dec. 11, 1951

2,578,628

UNITED STATES PATENT OFFICE 2,578,628

VALVE PROTECTOR

Joseph H. Hartman, Norristown, Pa.

Application May 31, 1949, Serial No. 96,311

4 Claims. (Cl. 251—150)

This invention relates to protectors for exposed working parts of valves which may be subject to excessive wear due to the collection of grime and dirt or chemicals on and between the exposed parts.

The problem here involved is similar to that which is described in my co-pending application Serial No. 96,313, filed on the same day, entitled Valve Protector.

In the present case, however, the invention is applied to a different type of valve construction, wherein the yoke is not integral with the valve casing, but is formed as a part of the gland for the packing around a valve stem, and the valve stem has lugs for guiding it on the legs of the yoke to prevent the valve stem from turning while it is moved inwardly or outwardly of the casing by a threaded shank passing axially through said valve stem and swivelled in the top of said yoke for rotation without axial displacement.

The object of this invention is to provide protector means for the exposed threaded shank particularly, and incidentally also for the working contacts between the valve stem and the legs of the yoke serving as guides for the valve stem.

A further object is to form two halves of a substantially cylindrical enclosure on opposite sides of said yoke, each half having a semicircular lower edge to fit around the base of the yoke member, and two vertical side edges joined by a top edge closely fitting along the corresponding sides of the legs of the yoke and the lower portion of the top of the yoke, said halves being held in place by a spring clip having a loop around and spaced from one of said yoke legs with its ends formed to extend partially around each half of the enclosure and to exert a resilient pressure toward each other.

A further object is to provide strips of sealing material around the edges of the enclosure halves defined above before mounting them in place, to produce a dust proof seal for the enclosure when mounted and held in place by the spring clip.

A further object is to make the enclosure defined above from light sheet material which is acid resistant.

Other and more specific objects will become apparent in the following detailed description of one form of the invention as applied to a particular type of valve construction, having reference to the accompanying drawing, wherein:

Figure 1 shows a valve in elevation with the enclosure of the invention applied thereto;

Figure 2 is a partial sectional view taken on the line 2—2 of Figure 1;

Figures 3 and 4 are sections taken on the lines 3—3 and 4—4 of Figure 1; and

Figure 5 is a plan view of the spring clip used for holding the two halves of the enclosure in place.

Referring to the drawing, the valve casing 1 has a valve stem 2 slidably passing through the top, with a packing groove and packing 3 around it. A packing gland made integral with the yoke 4 has a flange 5 with bolt holes therein for the studs 6 to pass through. Nuts 7 and springs 8 around these studs between the nuts and the flange 5 are used for exerting a continuous pressure on the packing 3.

The yoke 4 has a bore 9 in its top for the valve shank 10, and a counterbore 11 for the collar 12 on the valve shank, whereby the shank is restrained against axial displacement during operation of the valve by turning of the valve shank which is threaded into valve stem 2. The annular nut 13 is screwed into the counterbore 11 over the collar 12 to restrict the shank against axial movement.

The valve stem 2 has lugs 14 near the top fitting around both sides of the legs of the yoke to serve as guide means for the valve stem to prevent it from turning in its reciprocal movement through the casing 1 during valve operation.

The valve is operated by turning the valve shank 10 by means of the handwheel 15 fixed to the outer end thereof. As the shank is turned without axial movement, the valve stem, to which the valve head (not shown) is fixed, is made to travel up or down on the thread of the valve shank and thus opens or closes the valve.

It is obvious that in this type of valve, the valve shank thread and other working parts are largely exposed and would normally be subject to excessive wear for the reasons pointed out above.

To protect these parts against such wear, an enclosure is provided therefor, comprising the two halves 16 and 17 substantially identical in form, each having a substantially semicircular lower edge fitting over the upper surface of the flange 5 on one side of the yoke. The side edges are made to fit along the same side of each leg of the yoke and the upper edge joining the side edges conforms to the shape of the lower portion of the top of the yoke.

These edges may all be provided with a continuous strip 18 of packing or sealing material, and the two halves are placed on opposite sides of the yoke to form a complete enclosure about the working parts within the yoke. A spring clip 19 having a loop 20 and arcuate arms 21 is spread around the enclosure so that the two arms 21 grip the outside of the two halves 16 and 17 of the enclosure to hold them in place and to press the strips 18 against the adjacent surfaces of the yoke and flange, so as to form a dustproof seal for the enclosure.

Many obvious modifications in the form and arrangement of parts of this protector means may be made so as to conform with different forms of valves, without departing from the spirit and scope of the present invention, as defined in the appended claims.

What is claimed is:

1. In association with a valve of the type having a yoke projecting outwardly from a casing part, said yoke having diametrically opposite side arms extending upwardly from said casing part and a cylindrical bearing at the upper ends of the side arms, and an actuating shank extending outwardly between the side arms of said yoke and through said cylindrical center bearing; a protector comprising two enclosure sections at opposite sides of said yoke, said enclosure sections contacting with said casing part and cylindrical bearing and with said opposite sides of said yoke arms and cooperating with said casing part and yoke in forming a complete enclosure around said shank, and means for holding said enclosure sections in place.

2. A structure as specified in claim 1; said means for holding said enclosure sections in place consisting of a spring clip straddling one of said yoke arms and embracing said enclosure sections.

3. In association with a valve of the type having a yoke with diametrically opposite arms projecting outwardly from a casing part and with a center bearing at the outer ends of the arms, a valve member extending through said casing part and having guides slidably straddling the inner edges of the side arms of said yoke, and an actuating shank connected with said valve member and extending outwardly between said side arms and through said center bearing; a protector comprising two enclosure sections at opposite sides of said yoke, said enclosure sections contacting with said casing part, the side arms of the yoke and said center bearing, and means for holding said enclosure sections in place whereby said enclosure sections cooperate with said yoke and casing part in forming a complete enclosure for the outer end of said valve member, for said guides, for said inner edges of said side arms, and for the portion of said shank between said side arms.

4. A structure as specified in claim 3; said means for holding said enclosure sections in place consisting of a spring clip straddling one side arm of said yoke and embracing said enclosure sections.

JOSEPH H. HARTMAN.

REFERENCES CITED

The following references are of record in the file of this patent:

UNITED STATES PATENTS

| Number | Name | Date |
| --- | --- | --- |
| 748,720 | Glazier | Jan. 5, 1904 |
| 1,240,776 | Podobiedoff | Sept. 18, 1917 |
| 1,293,607 | Dawson | Feb. 4, 1919 |
| 1,374,774 | Solomon | Apr. 12, 1921 |
| 1,629,693 | Foltz | May 24, 1927 |
| 1,634,672 | Mallory | July 5, 1927 |
| 1,670,241 | Conner | May 15, 1928 |
| 1,865,670 | Boyce | July 5, 1932 |
| 2,113,060 | Sandberg | Apr. 5, 1938 |

FOREIGN PATENTS

| Number | Country | Date |
| --- | --- | --- |
| 615,381 | Germany | July 4, 1935 |